Jan. 6, 1925.  O. R. CURNUTT  1,521,931
AUTO SIGNAL
Filed Oct. 1, 1923
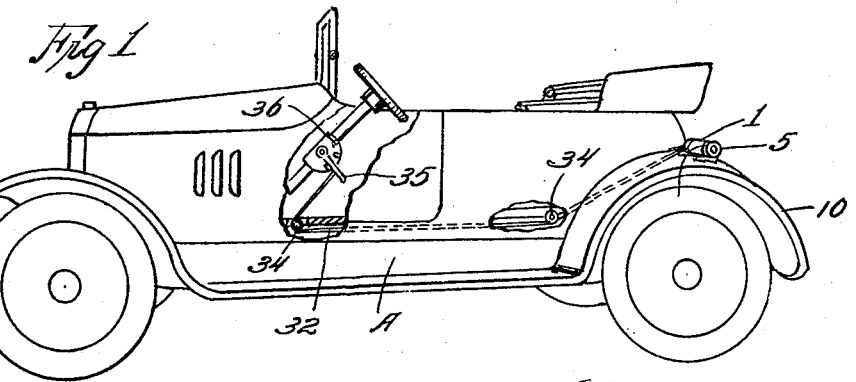
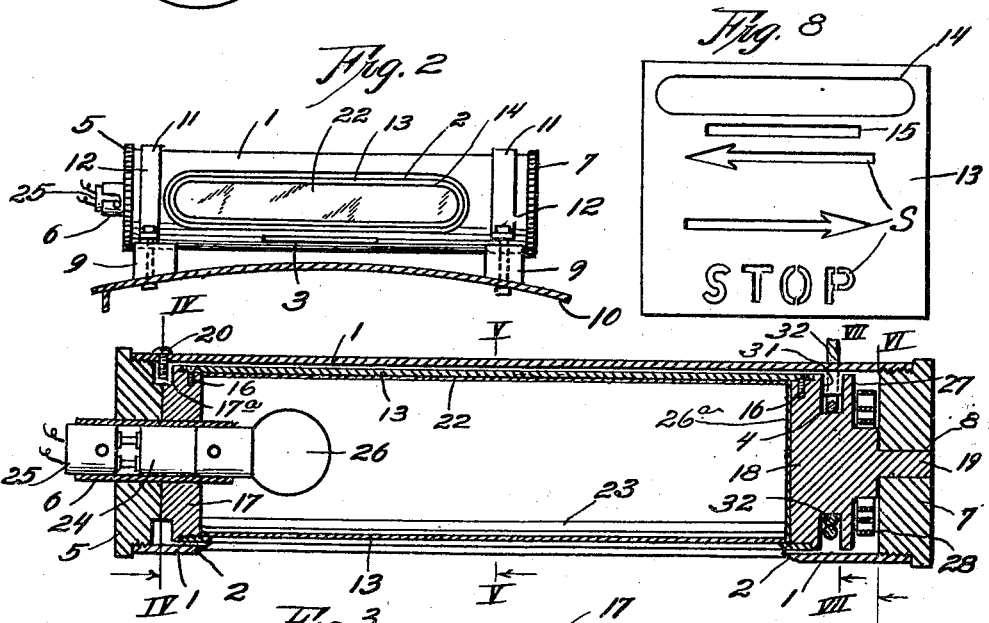
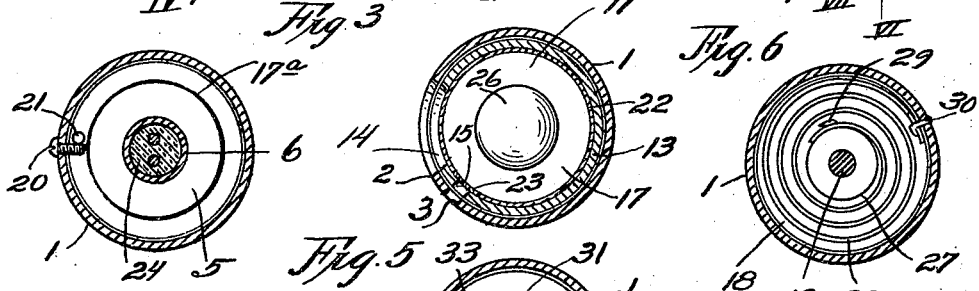
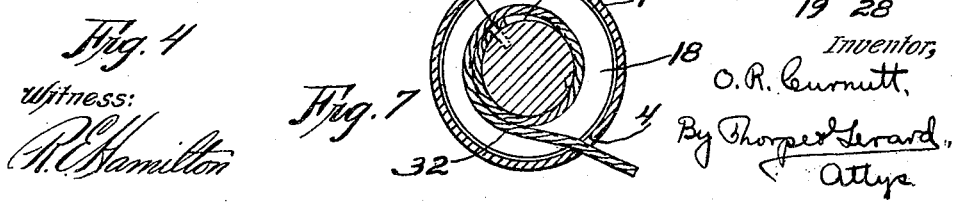
Inventor,
O. R. Curnutt,
By Thorpe & Gerard,
Attys.
Witness:
R. E. Hamilton Patented Jan. 6, 1925.

1,521,931

UNITED STATES PATENT OFFICE.

ORA R. CURNUTT, OF LEES SUMMIT, MISSOURI.

AUTO SIGNAL.

Application filed October 1, 1923. Serial No. 665,829.

*To all whom it may concern:*

Be it known that I, ORA R. CURNUTT, a citizen of the United States, and resident of Lees Summit, county of Jackson, State of Missouri, have invented a certain new and useful Improvement in Auto Signals, of which the following is a complete specification.

This invention relates to stop and direction indicating signals for automobiles and has for its objects to produce a compact and simple structure for use at the rear end of a car, whereby the driver may, through manually operable connections, readily and quickly indicate his intentions with respect to a contemplated change in the course of the automobile.

Another object is to produce a signal of the character described which, when in its normal position, functions as a tail light and in which provision is made for emitting a small amount of light for the illumination of license plates or the like.

A further object is to produce a signal of the character mentioned which is of compact, strong, durable, efficient and inexpensive construction; and in order that it may be fully understood, reference is to be had to the accompanying drawing, in which:—

Figure 1 is a view of a signal embodying the invention, as it will appear in operative relation to an automobile, the automobile being partly broken away to disclose parts otherwise hidden;

Figure 2 is an enlarged rear face view of the signal;

Figure 3 is an enlarged horizontal section taken through the signal;

Figure 4 is a section on the line IV—IV of Figure 3;

Figure 5 is a section on the line V—V of Figure 3;

Figure 6 is a section on the line VI—VI of Figure 3;

Figure 7 is a section on the line VII—VII of Figure 3; and

Figure 8 is a face view of the shield member bearing the direction indicating symbols.

In the said drawing, where like reference characters indicate corresponding parts in all of the figures, 1 indicates a tubular casing member which is provided with a series of slots 2 and 3 and opening 4 for purposes which will hereinafter appear.

The casing 1 is internally threaded at its opposite ends, and in threaded engagement with one end thereof is a closure cap 5 which is provided with an axially projecting sleeve 6; and at its other end said casing is closed by a cap 7 formed with a central opening 8.

The casing, as above described, is adapted to be mounted on a pair of blocks 9 carried by a rear fender 10 of an automobile A, and is held in position on said blocks by means of straps 11 secured by means of clamp bolts 12 engaged in the blocks 9, it being apparent, however, that the casing may be mounted in any convenient position on the car.

The direction indicating member comprises a signal casing 13, preferably of thin flexible metal which is formed with openings 14 and 15, respectively, for normal registration with the slots 2 and 3 of the casing 1, and in addition any suitable direction indicating symbols S are cut out of said shield. The shield 13 is rolled to cylindrical form and is secured at its opposite ends by means of screws 16 to a pair of closure members 17 and 18, the former being journaled on the sleeve 6, and the latter having a projecting stem 19 journaled in the opening 8 of the cap 7. It will be noted in this connection that the cap 5 and the closure 17 are respectively cut away, as at 17ª, to provide a channel for an inwardly projecting stop pin 20 carried by the casing 1, and adapted for cooperation with a second stop pin 21 projecting from the outer face of the closure 17, to limit the rotation of the shield cylinder, as will hereinafter appear.

Rolled up into cylindrical form and slipped within the shield cylinder is a sheet 22 of flexible red translucent material such as celluloid or the like, bridging the openings formed in the shield casing 13 and being preferably uncolored at 23, where it bridges the slot 15, which normally registers with the slot 3 of the casing for the illumination of a license plate or the like (not shown).

For the illumination of the signal, a plug 24 is mounted in the sleeve 6 and is adapted to be detachably engaged at one end by a plug designed to be included in the light circuit of the car, and at its other end is adapted for detachable connection with an electric bulb 26 for the illumination of the interior of the casing. In this connection it will be noted that the end of the casing 13 is provided with a suitable reflector 26ª to aid in the distribution of the light.

In order to provide means for the operation of the signal, the closure 18, adjacent the cap 7, is of reduced diameter, as indicated at 27, to provide an operating chamber for a coiled spring 28 secured at one end to the closure by means of a pin 29, and at its other end to the casing 1 by means of a pin 30. The spring 27 tends to maintain the cylinder 13 with its opening 14 (the tail light opening), normally in register with the opening 2 of the casing, the stop pins 20 and 21 limiting the rotating action of the spring 27.

Adjacent the reduced portion 27, the closure 18 is formed with a circumferential channel 31, within which one end of a pull cable 32 is secured by means of a pin 33. The cable is normally wound around the cylinder, and extends outside the casing 1 through the opening 4 and over a series of pulleys 34 to a lever 35, preferably mounted on the steering column, in convenient position for operation by the driver of the car. The lever 35 cooperates with a series of stops 36, whereby the cylinder 13 may be manually rotated against the action of its spring 27 and maintained in position for the exposure of any desired signal symbol through the slot 2 of the casing, it being apparent that normally the slot 14 (for the tail light) will be illuminated, and that the signal symbols will successively be displayed as the cylinder is rotated. It will be understood, of course, that the spring 27 will return the signal to normal position immediately the lever 35 is freed for return operation.

It is also evident that the signal is composed of relatively few parts, is comparatively water and dust proof, and is readily dismantable for replacement of the electric light bulb or for cleaning.

As a further feature of advantage, it is to be noted that the signaling action is equally visible by night as well as by day, and also that the device may be operated in advance of any turning movement, to give any desired signal and set to maintain such signal in operation while the further attention of the driver is devoted entirely to the operation of the steering wheel as required to control the movement of the car.

From the above description it will be apparent that I have produced a device of the character described which possesses all of the features of advantage set forth as desirable, and while I have described and illustrated the preferred embodiment of the same, I reserve the right to make all changes properly falling within the spirit and scope of the appended claims.

I claim:

1. In an automobile signal, a fixed casing provided with an opening, a rotatable casing within said first-named casing and having a series of direction indicating symbols adapted for successive display through said opening, one end of said casing being of reduced diameter, a spring coiled around said reduced end of the casing and maintaining the same in a predetermined position; said reduced end of the casing being also formed with a circumferential channel, and a pull cord normally wound around said casing within said channel and adapted to impart rotation thereto.

2. In an automobile signal, a fixed casing provided with an opening, a rotatable casing within said first-named casing and having a series of direction indicating symbols adapted for successive display through said opening, one end of said casing being of reduced diameter, a spring coiled around said reduced end of the casing and maintaining same in a predetermined position; said reduced end of the casing being also formed with a circumferential channel, a pull cord secured to said casing and normally wound around the same within said channel, a lever secured to the free end of said cord and manually operable to rotate said signal casing, and an electric light within said rotatable casing.

3. In an automobile signal, a fixed casing provided with an opening and end closures, a rotatable casing within said fixed casing and having a series of direction indicating symbols adapted for successive display through said opening, a sleeve projecting through one of the closures of the fixed casing and forming a signal light support and bearing for the rotatable casing, a detachable closure for the opposite end of the rotatable casing comprising a member formed with a circumferential channel and a pair of reduced portions, an operating cord in said channel, and an operating spring in one of said reduced portions; the other reduced portion being rotatably received in an opening in one end closure of the fixed casing.

In witness whereof I hereunto affix my signature.

ORA R. CURNUTT.